United States Patent [19]

Tamura et al.

[11] Patent Number: 5,074,610
[45] Date of Patent: Dec. 24, 1991

[54] AUTOMOBILE MOLDING MEMBER HAVING IMPROVED WEIR STRUCTURE

[75] Inventors: Tatsuya Tamura; Nobuo Igarashi; Sadao Konno; Hiroyuki Nakajima, all of Yokohama, Japan

[73] Assignee: Hashimoto Forming Industry Co., Ltd., Yokohama, Japan

[21] Appl. No.: 379,283

[22] Filed: Jul. 13, 1989

Related U.S. Application Data

[62] Division of Ser. No. 180,893, Apr. 13, 1988, Pat. No. 4,865,796.

[30] Foreign Application Priority Data

Jan. 29, 1988 [JP] Japan .................. 63-19289

[51] Int. Cl.$^5$ .............................................. B60J 10/20
[52] U.S. Cl. ..................................... 296/93; 296/208; 296/213; 52/400
[58] Field of Search ................. 296/93, 208, 213; 52/400

[56] References Cited

U.S. PATENT DOCUMENTS

| 2,610,714 | 9/1952 | Bradley ................................. 52/400 |
| 2,763,346 | 9/1956 | Clingman .............................. 52/400 |
| 4,757,659 | 7/1988 | Miyakawa et al. ............... 296/93 X |
| 4,757,660 | 7/1988 | Miyakawa et al. ............... 296/93 X |
| 4,833,847 | 5/1989 | Inayama et al. .................. 296/93 X |
| 4,840,001 | 6/1989 | Kimisawa .......................... 296/93 X |

FOREIGN PATENT DOCUMENTS

| 1235164 | 2/1967 | Fed. Rep. of Germany ........ 296/93 |
| 0178422 | 8/1987 | Japan ................................. 296/93 |
| 0214012 | 9/1987 | Japan ................................. 296/93 |
| 0231814 | 10/1987 | Japan ................................. 296/93 |

Primary Examiner—Dennis H. Pedder
Attorney, Agent, or Firm—Stevens, Davis, Miller & Mosher

[57] ABSTRACT

A novel method of producing molding members for automobiles, formed at least partly of a synthetic resin material is disclosed. According to the method of the invention, synthetic resin material is extrusion molded into a continuous body with a substantially constant cross-section throughout the entire length thereof. A controlled amount of the material is removed from a predetermined location of the continuous body, corresponding to a water flow blocking projection, synchronously with the extrusion molding of the material, such that the cross-section of the continuous body varies in the longitudinal direction of the body. The continuous body subjected to the controlled removal of the material is then cut into the predetermined length of the molding member.

6 Claims, 11 Drawing Sheets

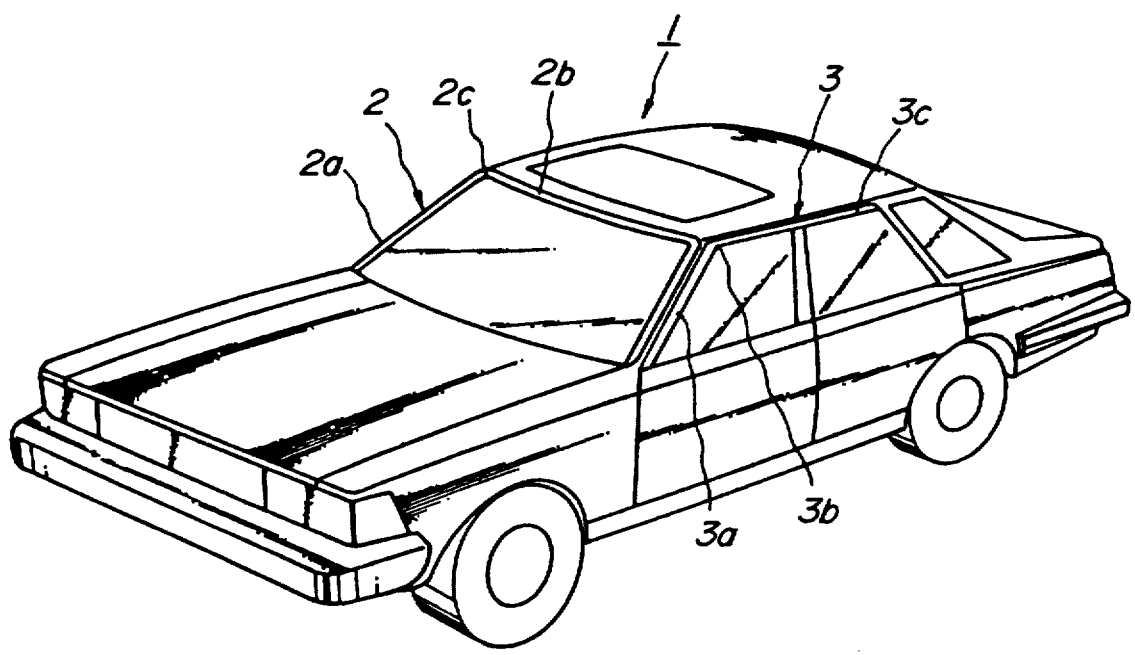
FIG_1

FIG_2
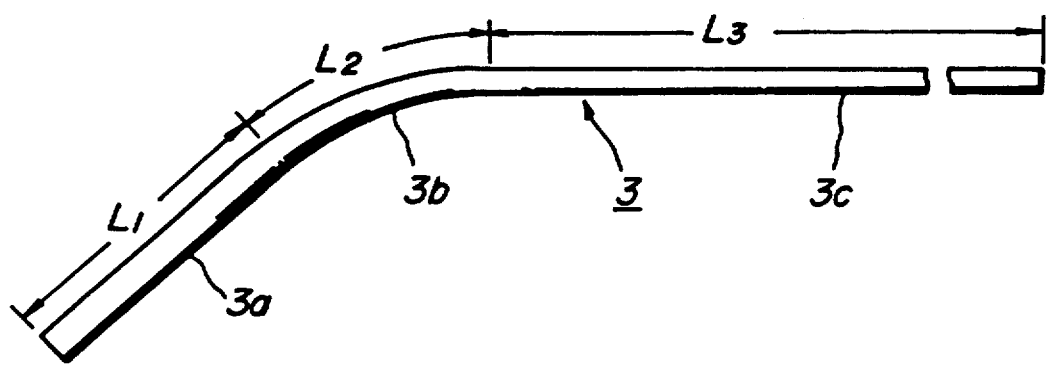
FIG_3
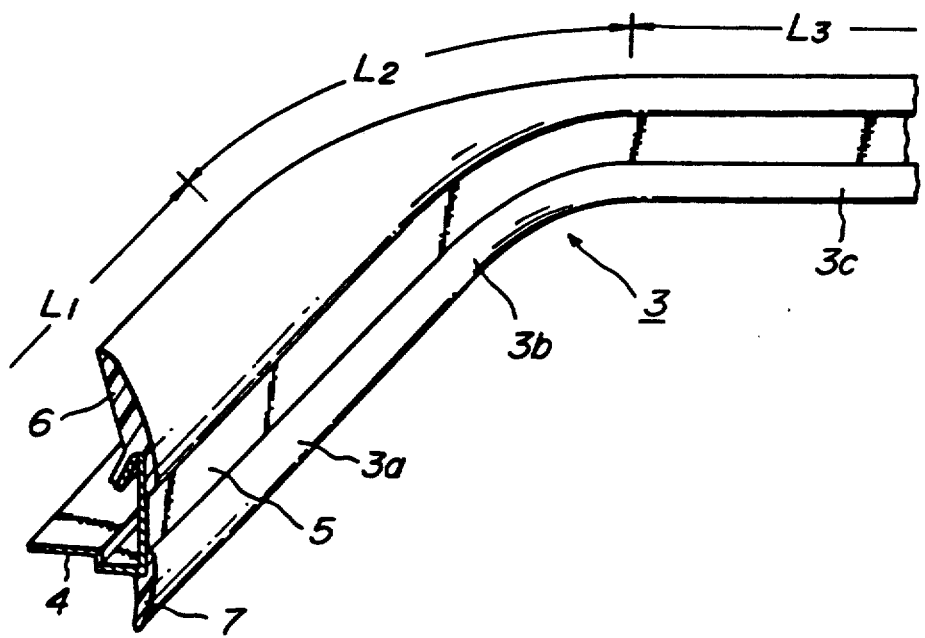

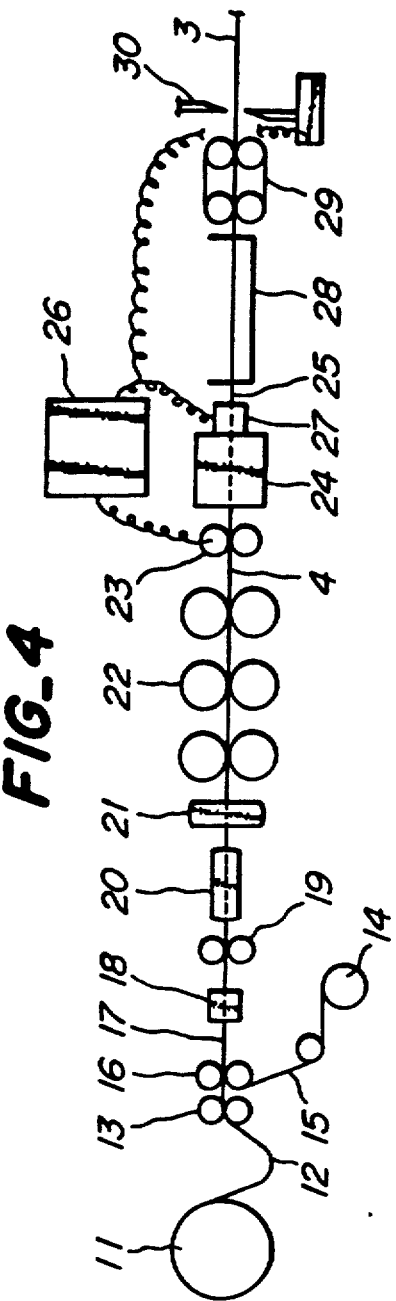
FIG._4
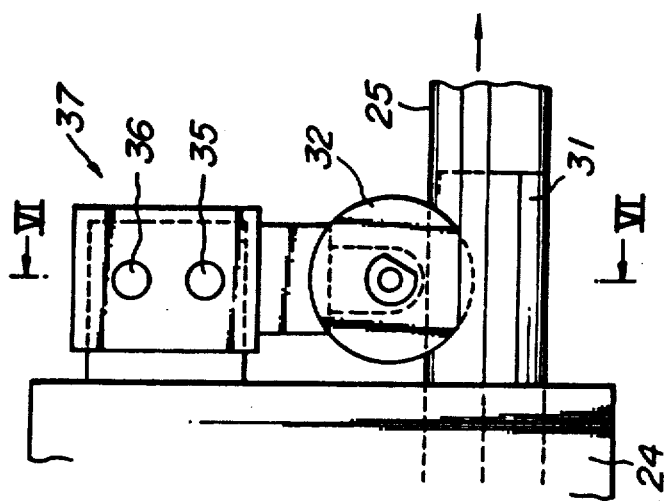
FIG._5

FIG_6
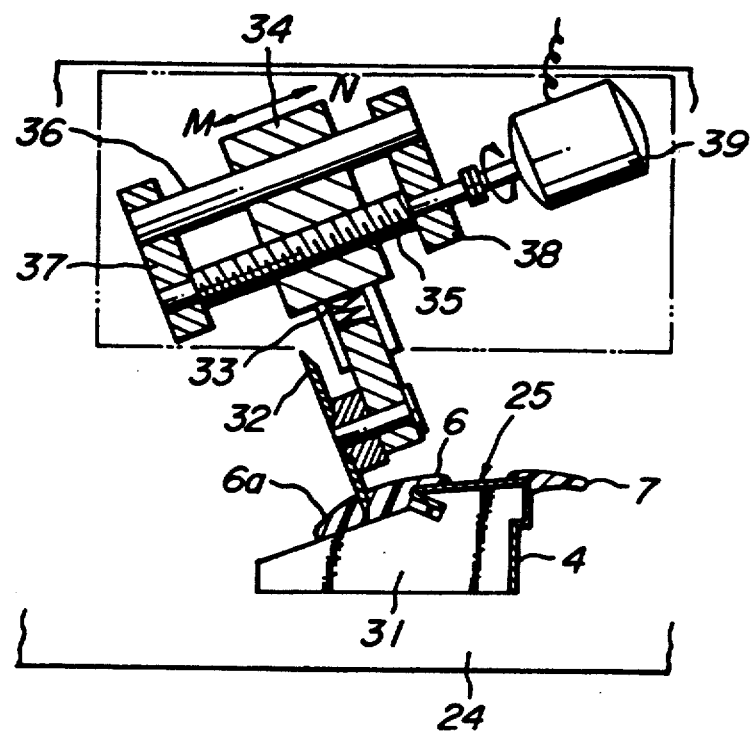
FIG_7
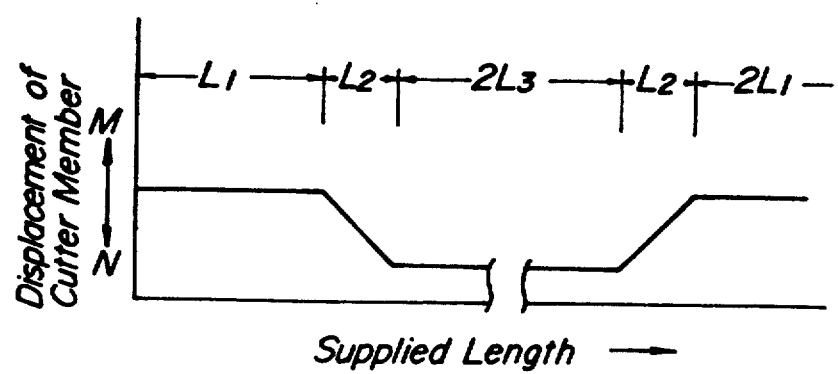

FIG_8
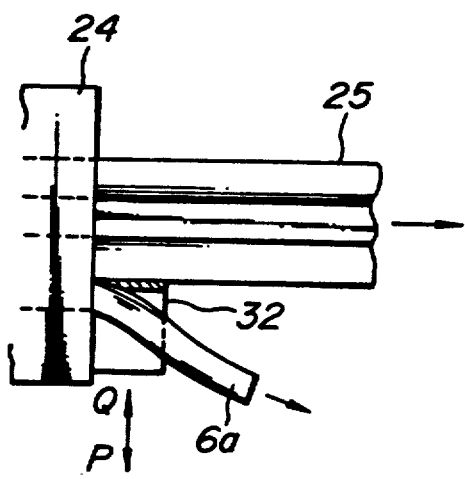
FIG_9
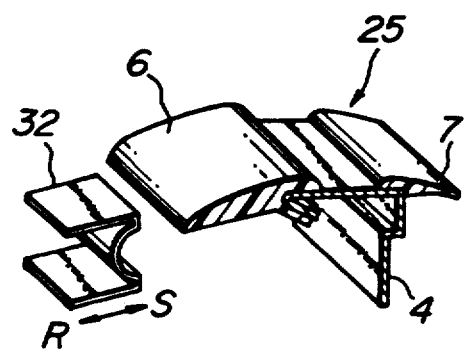
FIG_10
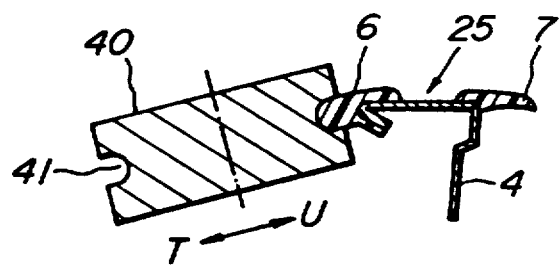

FIG_11
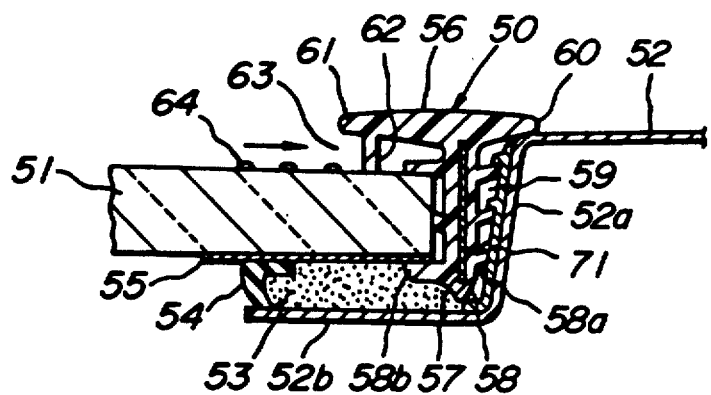
FIG_12
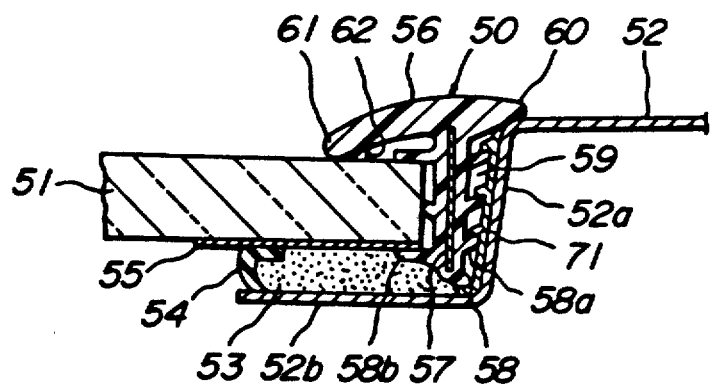

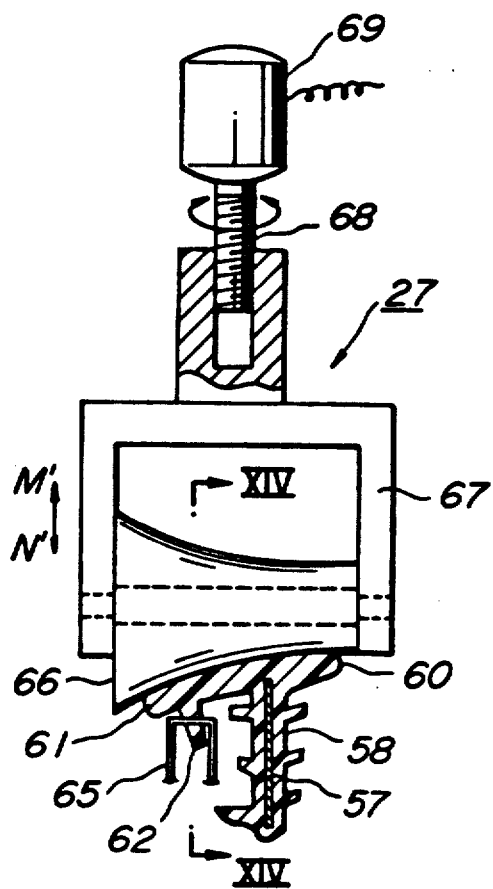
FIG_13
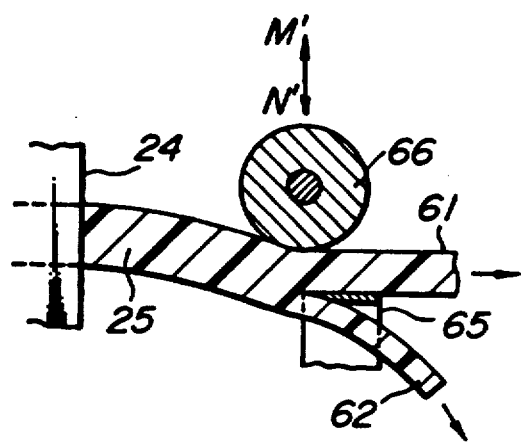
FIG_14
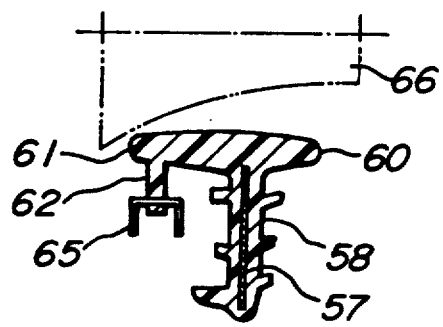
FIG_15
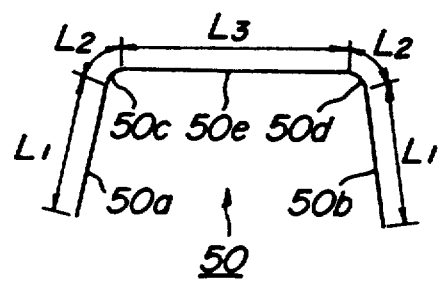
FIG_16

FIG_17
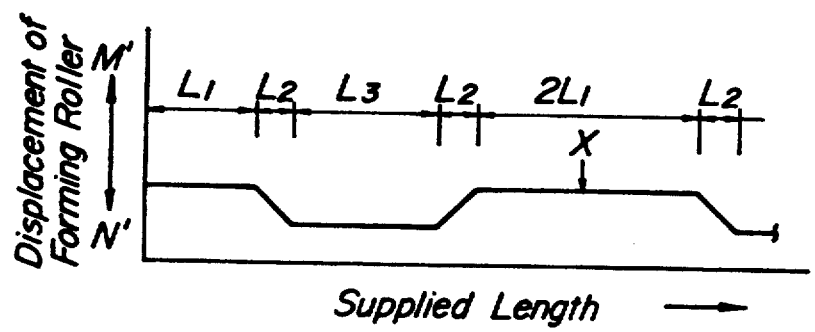
FIG_18
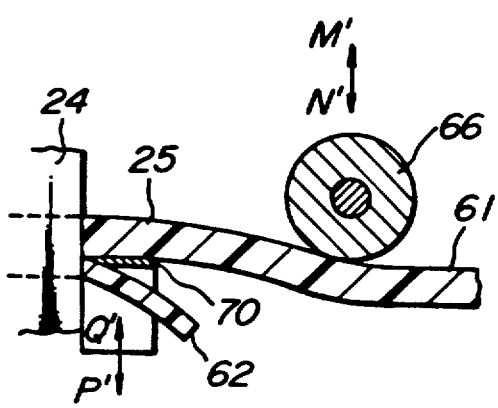

FIG_19
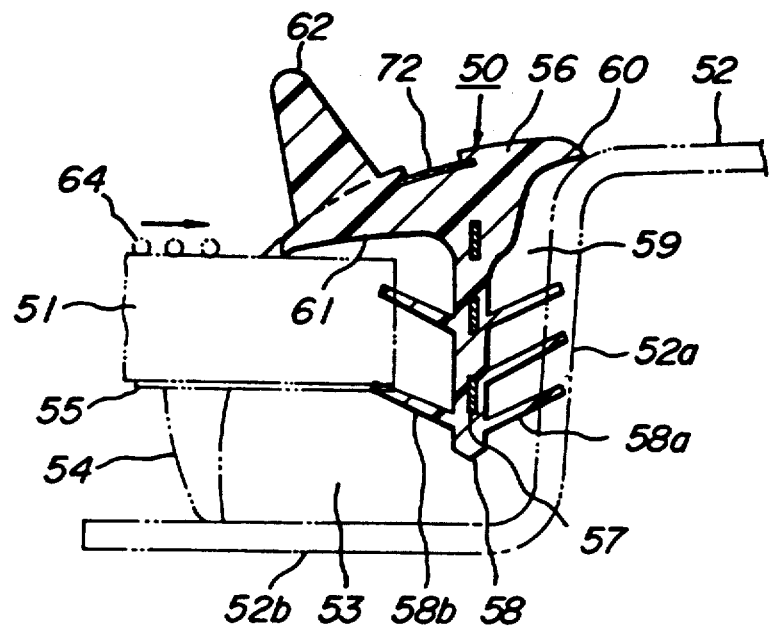
FIG_20
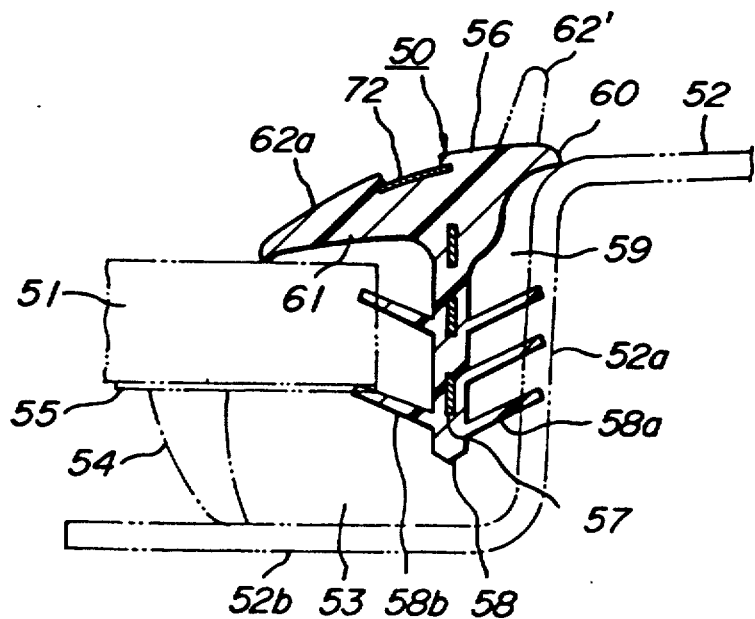

FIG_21
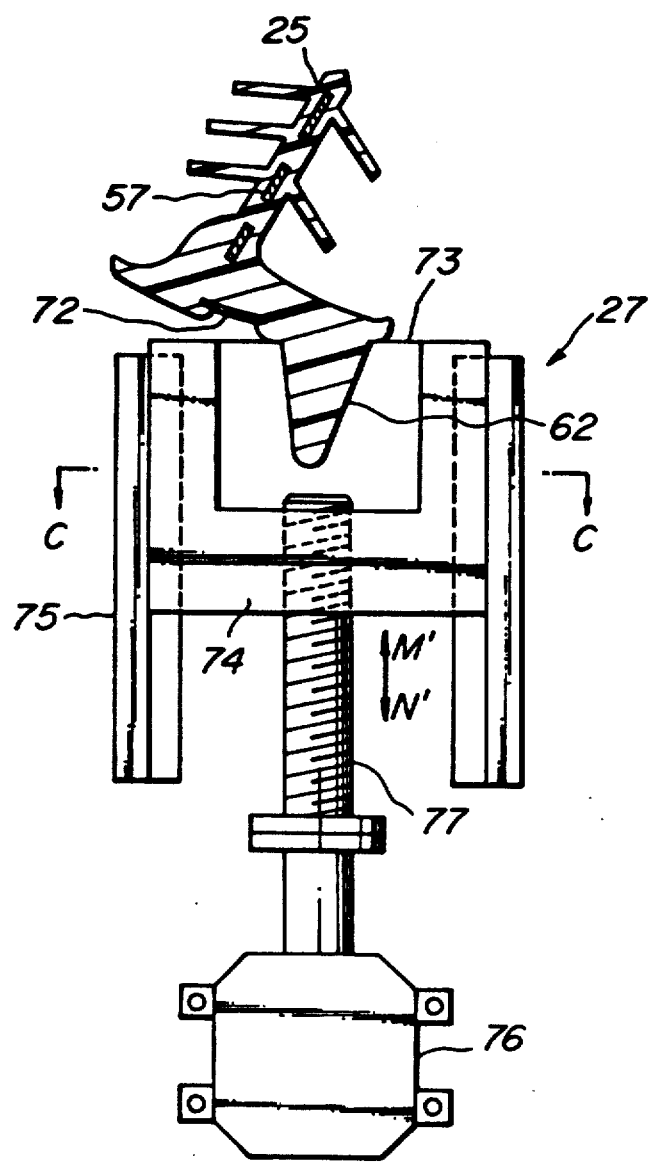
FIG_22
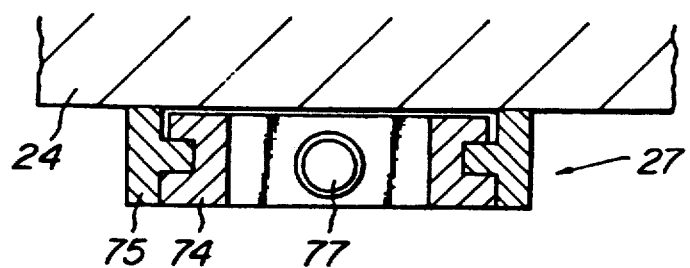

FIG_23
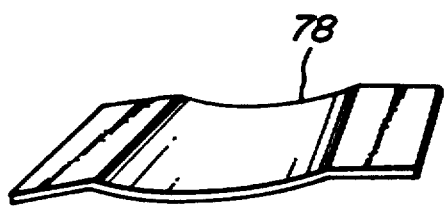
FIG_24
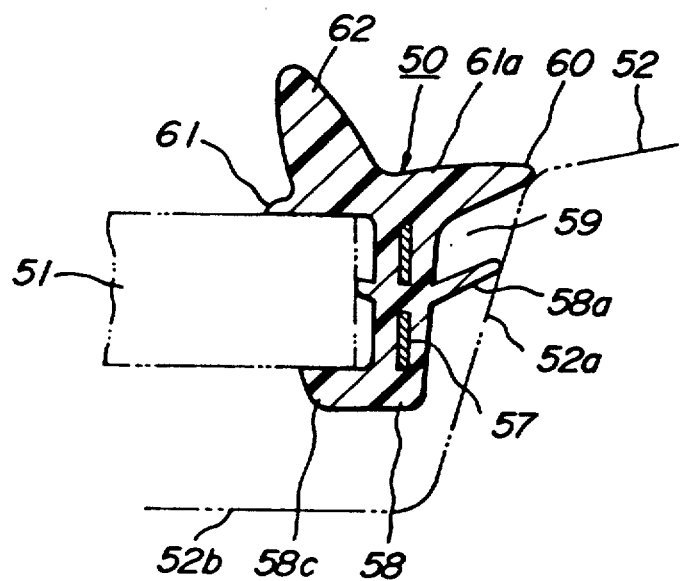

AUTOMOBILE MOLDING MEMBER HAVING IMPROVED WEIR STRUCTURE

This is a division of application Ser. No. 07/180,893, filed Apr. 13, 1988, now U.S. Pat. No. 4,865,796.

BACKGROUND OF THE INVENTION

1. Field of the Invention

The present invention relates to a method of producing molding members for automobiles, formed at least partly of a synthetic resin material.

2. Description of the Related Art

An automobile employs various kinds of elongate molding members formed at least partly of a synthetic resin material, such as drip molding members, front and rear window molding members, etc. Of these, the drip molding member extends along the front pillar and the side edge of the roof panel of the vehicle body, while front and rear window molding members extend respectively along the periphery of the front and rear window plates, i.e. along the front and rear pillars and the front and rear edges of the roof panel. A variety of requirements are imposed on the molding members, mainly from design and/or functional viewpoint, resulting in an increased demand in the automobile industry for molding members whose cross-sectional shape varies in the longitudinal direction.

More particularly, one proposal is directed to a window molding member having side portions with a first predetermined cross-sectional shape, an upper portion with a second predetermined cross-sectional shape, and corner portions arranged between the side and upper portions, where the cross-sectional shape changes gradually from the first to the second.

Another proposal is directed to a drip molding member composed of a core element in the form of a metal strip which has been shaped into the desired cross-sectional shape, as well as upper and lower lip elements of synthetic resin material which are integral with the core element and molded such that the core element is partly exposed to, and visible from the outside as a longitudinally extending ornamental portion with a metallic luster. The lower lip element is of a cross-sectional shape that is substantially constant throughout the entire length, while the upper lip element has a pillar portion with a relatively wide first cross-sectional shape, a roof portion with a relatively narrow second cross-sectional shape, and a corner portion between the pillar and roof portions, where the cross-sectional shape changes gradually from the first to the second.

To produce elongate molding members whose cross-sectional shape varies in the longitudinal direction, it has been a conventional practice to use a process which includes preparation of the core element by shaping the raw metal strip into the desired cross-sectional shape with a roll forming machine, press machine, etc., placing each core element in the mold of an injection molding machine, and subsequently molding the synthetic resin material into the desired configuration. With such a process, however, since the entire core element of the elongate molding member has to be completely accommodated in the mold, the molding machine as a whole becomes very bulky and requires a substantial space in the factory. Moreover, the process involves relatively complex steps with which the molding members can be produced only one by one, and it is thus difficult to improve the productivity.

Another possibility for the production of such molding members is to physically divide each molding member into first and second extrude portions with the respectively predetermined cross-sectional shapes, which are connected with each other either by an injection molding process or by using a separate connection piece. However, connection of the two portions by means of the injection molding accompanies formation of undersirable burrs along the junctions and resultant deterioration in the appearance, while use of the separate connection piece results in the increased number of the required components and assembly steps.

SUMMARY OF THE INVENTION

Therefore, it is a primary object of the present invention to provide a novel method of producing elongate molding members for automobiles, having a cross-sectional shape which is variable in the longitudinal direction, in a facilitated manner and with an improve productivity.

According to the present invention, there is provided a method of producing molding members for automobiles, which comprises the combination of the following three steps. The first step is extrusion molding synthetic resin material into an elongate continuous body with a substantially constant cross-section throughout the entire length of the continuous body. The second step is the removal of a controlled amount of the synthetic resin material from a predetermined location of the continuous body. The removal is carried out synchronously with the extrusion molding of the synthetic resin material, in such a manner that the cross-section of the continuous body varies in the longitudinal direction. Finally, in the third step, the continuous body which has already been subjected to the removal of the synthetic resin material is cut into a predetermined length of the molding member.

With the above-mentioned method of the present invention, the longitudinally variable cross-sectional shape of the molding member can be readily obtained essentially based on extrusion molding technology, simply by removing a controlled amount of the synthetic resin material from a predetermined location of the continuous body after it has been extruded, and by subsequently cutting the continuous body into a predetermined length of the molding member. According to the present invention, all the process steps can be carried out continuously, as contrasted with the conventional injection molding method, so that it is possible to produce the molding members with the desired, longitudinally variable cross-sectional shape, by means of a compact arrangement of the facility, and with a markedly improved productivity.

Moreover, connection of separately extruded portions of a molding member, either by means of an injection molding process or by a connection piece, is not necessary, so that the present invention does not require the assembly of a plurality of components when producing a molding member, and preserves an excellent appearance of the product in an advantageous manner.

BRIEF DESCRIPTION OF THE DRAWINGS

FIG. 1 is a perspective view of an automobile with molding members which may be produced by the method in accordance with the present invention;

FIG. 2 is a side view of a drip molding member shown in FIG. 1;

FIG. 3 is a fragmentary perspective view, in an enlarged scale, of the drip molding member shown in FIG. 2;

FIG. 4 is a system diagram of the production line for carrying out the method of the present invention, which is adapted to produce various molding members;

FIG. 5 is a side view of the first cutting station as shown in FIG. 4;

FIG. 6 is a sectional view taken substantially along the line A—A in FIG. 5;

FIG. 7 is a diagram showing the relation between the displacement of the cutter member and the supplied length of the core element;

FIGS. 8 and 9 show modifications of the cutting members;

FIG. 10 shows another modified example which is further provided with a reforming roller behind the cutter member;

FIG. 11 is a sectional view of the side portion of the window molding member, which may be produced by the method in accordance with the present invention, and which has been secured to an automobile body;

FIG. 12 is a sectional view of the upper portion of the window molding member shown in FIG. 11;

FIG. 13 is a front view of the first cutting station adapted to produce the window molding member shown in FIGS. 11 and 12;

FIG. 14 is a sectional view taken substantially along the line B—B in FIG. 13;

FIG. 15 is a front view similar to FIG. 13, but showing a different operational position of the forming roller;

FIG. 16 is a schematic view showing the length of each portion of the window molding member;

FIG. 17 is a diagram showing the relation between the displacement of the forming roller and the supplied length of the core element;

FIG. 18 is a side view showing the modification to the cutting station shown in FIGS. 13 and 14;

FIG. 19 is a sectional view of the side portion of another window molding member, which may also be produced by the method in accordance with the present invention;

FIG. 20 is a sectional view of the upper portion of the window molding member shown in FIG. 19;

FIG. 21 is a front view of the cutting station which may be used to produce the window molding member shown in FIGS. 19 and 20;

FIG. 22 is a sectional view of the cutting station taken substantially along the line C—C in FIG. 21;

FIG. 23 is a perspective view of another example of the cutter member; and

FIG. 24 is a sectional view of still another window molding member which may also be produced by the method in accordance with the present invention.

DESCRIPTION OF THE PREFERRED EMBODIMENTS

The present invention will now be explained in further detail, by referring to some preferred embodiments shown in the attached drawings.

There is shown in FIG. 1 an automobile designated as a whole by reference numeral 1, which is provided with various kinds of elongate molding members composed at least partly of a suitable synthetic resin material. These molding member include, among others, a front window molding member 2, a drip molding member 3, etc., and the present invention is applicable to produce these elongate molding members with an improved productivity, as will be fully explained hereinafter.

The front window molding member 2 is arranged along the periphery of side or the windshield plate, and includes a pair of side or pillar portions 2a extending along the front pillars of the automobile 1, respectively, an upper or roof portion 2b extending along the front edge of the roof panel of the automobile 1, and a pair of corner portions 2c arranged between the pillar portions 2a and that roof portion 2b. Each pillar portion 2a has a predetermined first cross-sectional shape which is substantially constant throughout the entire length of that portion 2a. Similarly, the roof portion 2b has a predetermined second cross-sectional shape which is substantially constant throughout the entire length of that portion 2b, but which is different from that of the pillar portion 2a. Consequently, the shape of the pillar portion 2a gradually changes to that of the roof portion 2b in each corner portion 2c, or in its neighborhood.

On the other hand, the drip molding member 3 is arranged along the front pillar and the side edge of the roof panel of the automobile, and includes a pillar portion 3a of a length $L_1$, a corner portion 3b of a length $L_2$ and a roof portion 3c of a length $L_3$. The drip molding member 3 is composed of a core element 4 having an ornamental outer surface 5 with a metallic luster, and upper and lower lip elements 6, 7 which are arranged along the upper and lower edges of the core element 4, respectively, in such a manner that the ornamental outer surface 5 of the core element 4 is exposed outside between the lip elements 6, 7.

The core element 4 is formed of a metal strip, such as a stainless steel strip, shaped into a desired cross-section which is substantially constant throughout the entire length of the drip molding member 3. The upper and lower lip elements 6, 7 are formed of suitable synthetic resin material which has been co-extruded about the core element 4. The lower lip element 7 has a cross-section which is substantially constant throughout the entire length of the drip molding member 3, while the upper lip element 6 has a cross-section which varies in the longitudinal direction of the molding member 3. More particularly, the upper lip element 6 has a relatively wide and substantially constant cross-section along the pillar portion 3a, a relatively narrow and substantially constant cross-section along the roof portion 3c, and a transitional cross-section along the corner portion 3b between the pillar and roof portions 3a, 3c in which the wide section changes gradually to the narrow section.

According to the present invention, the above-mentioned molding members 2, 3 can be produced in the manner to be described hereinafter. Just for the sake of convenience, the following description will be made with reference to the production of the drip molding member 3.

There is shown in FIG. 4 a system diagram of the production line for carrying out the method according to the present invention. The production line includes an uncoiler 11 from which a metal strip 12 is continuously supplied by a pair of pinch rollers 13. Another roller 14 serves to continuously supply a protective tape 15 which is separably adhered, by means of a pair of adhesion rollers 16, onto that portion of the metal strip 12 which eventually forms the ornamental portions 5 of the molding member 3 with the desired metallic luster, and which has thus to be protected by the tape 15. The metal strip 12 applied with the protective tape 15 forms a composite body 17 which, subsequently, is subjected to surface degreasing and cleaning at a cleaning station 18 for carrying out a sanding or the like treatment, is coated with an adhesive material at a roll coating station 19, and is subjected to baking at the baking station 20. The composite body 17 is further passed through and cooled in a cooling tank 21, and is then shaped into a desired, longitudinally constant cross-section at a roll forming machine 22 to form a continuous core element 4 of the molding member 3.

The core element 4 so obtained is supplied to a measuring station 23 which includes a rotary encoder or the like detector for measuring the supplied length of the core element 4, and then to an extrusion die 24 which is further supplied with a suitable synthetic resin material in its heated molten state. The molten synthetic resin material is co-extruded from the extrusion die 24 as a continuous extruded body 25 in which the upper and lower lip elements 6, 7 are made integral with the core element 4, whereby the extruded body 25 has a substantially constant cross-section which corresponds to that of the pillar portion 3a of the molding member 3.

To produce molding members with a longitudinally variable cross-section, in accordance with the illustrated preferred embodiment of the present invention, the extruded body 25 as extruded from the extrusion die 24 is further subjected to the removal of a controlled amount of synthetic resin material from the predetermined location of the upper lip element 6. To this end, there is provided a controller 26 which is adapted to receive from the measuring station 23 a signal representing the supplied length of the core element 4, while a first cutting station 27 is arranged on the exit or discharge side of the die 24 and is adapted to be controlled by the controller 26 according to the supplied length of the core element 4. The extruded body 25 is subsequently passed through a cooling tank 28 where it is cooled, and is then advanced by a take-up device 29 and cut into the predetermined length of the product at a second cutting station 30 which, too, is controlled by the controller 26 according to the supplied length of the core element 4.

As particularly shown in FIGS. 5 and 6, the first cutting station 27 includes a support table 31 arranged adjacent to, and on the discharge side of, the extrusion die 24 for supporting the extruded body 25 as it is extruded from the die 24, a rotatable cutter blade 32 biased toward the support table 31 by means of a compression coil spring 33, as well as a slider member 34 for mounting the cutter blade 32 which member is movable in a direction that extends in parallel with the rotational axis of the cutter blade 32. The slider member 34, per se, is supported by a threaded drive shaft 35 and a stationary guide rod 36 which is fixedly secured to a pair of brackets 37, 38. The drive shaft 35 is rotatably journalled by the brackets 37, 38, is in mesh with the slider member 34, and is connected to a reversible servomotor 39 which is adapted to be controlled by the controller 26. Thus, by actuating the servomotor 39 in the normal or reverse direction, the cutter blade 32 is caused to move in the desired axial direction M or N both indicated by double arrow in FIG. 6, in accordance with the length of the core element 4 supplied to the extrusion die 24.

FIG. 7 shows the relation between the length of the core element 4 which has been supplied to the extrusion die 24 and the displacement of the cutter member 32, during the production of the drip molding member 3 explained above with reference to FIGS. 2 and 3.

For the period in which the extrusion die 24 discharges that portion of the extruded body 25 which corresponds to the pillar portion 3a of the molding member 3 with the length $L_1$, co-extrusion of the synthetic resin material with the core element 4 is carried out with the cutter member 32 maintained at an extreme position in the axial direction M, after the servomotor 39 has been actuated in the normal direction. In this extreme position, the cutter member 32 is spaced from the upper lip element 6 of the molding member 3.

As the detector of the measuring station 23 detects the completion of the supply of twice the length $L_1$ of the core element 4, or the beginning point of the corner portion 3b of the length $L_2$, the controller 26 supplies a command signal to the servomotor 39. By this the servomotor 39 is actuated in the reverse direction, causing the cutter member 32 to move in the axial direction N. During this movement, the cutter member 32 comes into contact with the upper lip portion 6. As the cutter member 32 is further moved toward another extreme position in the axial direction N, until completion of the supply of length $L_2$ of the core element 4, the cutter member 32 removes a desired part 6a of the synthetic resin material of the upper lip element 6 with a gradually increasing width.

When the detector at the measuring station 23 detects the beginning point of the roof portion 3c of the drip molding member 3 with the length $L_3$, the servomotor 39 is stopped so that the cutter member 32 is maintained in its extreme position in which the removal of the synthetic resin material is carried out with the maximum width.

The cutter member 32 is maintained in this extremem position until the detector of the measuring station 23 detects completion of the supply of twice the length $L_3$ of the core element 4. At such occasion, the controller 26 supplies a command signal to the servomotor 39 to actuate the latter in the normal direction. By this, the cutter member 32 is caused to move in the axial direction M, removing the synthetic resin material from the upper lip element 6 with a gradually decreasing width until the detector of the measuring station 23 detects completion of the supply of the length $L_2$ of the core element 4.

Subsequently, the cutter member 32 is disengaged from the lip element 6 and is returned to its initial extreme position in the axial direction M. The cutter member 32 is maintained in this position for a new cycle of operation.

Preferably, the removal of the synthetic resin material is carried out while the extruded body 25 is still hot and soft.

The extruded body 25 subjected to the removal of the synthetic resin material at the first cutting station 27 is then supplied to the second cutting station 30 where it is cut into the predetermined length of the desired molding member 3 at predetermined positions of the extruded body 25 which correspond to the centers of the length $2L_1$ and $2L_3$, respectively.

Furthermore, by repeating the above-mentioned operations, the molding members can be continuously produced one by one, in an efficient and reliable manner.

FIGS. 8 through 10 show various modified embodiments of the first cutting station 27, the particulars of which will be briefly explained below.

The embodiment shown in FIG. 8 features an arrangement wherein the cutter member is formed of a cutter plate with a sharp edge, which is disposed on the discharge end wall of the extrusion die 24 and is movable in the directions P and Q, both indicated by double arrow, so as to provide a longitudinally variable width of that part 6a of the synthetic resin material of the upper lip element 6, which is to be removed in accordance with the length of the core element 4 supplied to the extrusion die 24.

The embodiment shown in FIG. 9 features an arrangement wherein the cutter member 32 is formed of a plate which is movable in the directions R and S both indicated by double arrow. The cutter blade 32 is so shaped as to define an arcuate blade portion, whereby the cut section of the upper lip element 6 becomes partly arcuate when longitudinally variable amount of the synthetic resin material is removed in accordance with the length of the core element 4 supplied to the extrusion die 24.

The embodiment shown in FIG. 10 includes a reforming roller 40 arranged behind the cutter member 32, which roller is formed with a circumferentially extending reforming groove 41. The reforming roller 40 may be combined with any of the above-mentioned cutter members 32, and serves to effectively reform the surface of the molding member 2, 3 with undesirable sharp edges or uneven cut sections, which have been formed as a result of the cutting operation or removal of the synthetic resin material by means of the cutter member 32. To this end, the reforming roller 40 is adapted to be moved in the directions T and U, both indicated by double arrow, synchronously with the movement of the cutter member 32 in the axial directions M and N, P and Q, or R and S.

The embodiments thus far described have been directed to an arrangement wherein the removal of the synthetic resin material from the upper lip element 6 of the drip molding member 3 is effected with respect to the corner and roof portions 3b, 3c, only. It is, however, possible to remove the material with a relatively small width from the lip element 6 along the pillar portion 3a of the molding member 3 as well. Also, the cutter member 32 and/or the second cutting station may effect the respective cutting operation in accordance with the length of the extruded body 25, instead of the supplied length of the core element 4. This is particularly effective for a molding member without the core element.

Another embodiment of the present invention, which is applied to the production of the window molding member, will now be explained with reference to FIGS. 11 and 12. The molding member to be produced is designated as a whole by reference numeral 50, and is adapted to be arranged along the outer periphery of a front or rear window plate 51 which is formed of a transparent inorganic glass or transparent synthetic resin, such as polycarbonate resin, acrylic resin, or the like. The window plate 51 is secured to the automobile body panel 52 by means of an adhesive material 53, with a rubber dam member 54 arranged between the plate 51 and the body panel 52. The window plate 51 is further provided, on its rear surface, with an opaque printed layer 55 which extends along the periphery of the plate 51 so that the adhesive material 53 and the dam member 54 are not visible from outside, which thus provides a highly refined appearance.

The window molding member 50 includes a main body 56 which is formed of flexible and/or soft polyvinylchloride (PVC) resin, ionomer resin, ethylenevinyl acetate copolymer (EVA) resin, transparent cellulose acetate butylate (CAB) resin, appropriate synthetic rubber material or other suitable thermoplastic and elastomeric synthetic resin material with a flexibility. The material forming the main body 56 is extruded about a metal strip forming a core element 57 which is thus embedded in the synthetic resin material of the main body 56.

More particularly, as shown in FIG. 11 illustrating the cross-section of the molding member 50 at its side portion when the window plate 51 is a front window plate, the main body 56 of the window molding member 50 includes a leg section 58 extending into a gap 59 left between the window plate 51 and the automobile body panel 52. The main body 56 further includes a pair of lip sections 60, 61 formed on, and projecting from both sides of the leg section 58. The lip section 60 has a free end which bears against the outer surface of the automobile body panel 52, while the lip section 61 is formed with a projection 62 in the form of a ridge near the free end thereof, which bears against the outer surface of the window plate 51. The projection 62 cooperates with the free end of the lip section 61 and the window plate 51 to define a channel 63 which serves to prevent side flow of the water or rain drops 64 across the front pillar of the automobile, from the front window plate toward the side window, and effectively preserves the driver's and/or navigator's sight through the side window, during the driving of the automobile in rainy climate condition. In other words, the channel 63 guides the flow of water or rain drops 64 along the side edge of the front window plate 51.

The channel 63 thus extends along the front pillar of the automobile, but is not required along the junction between the upper edge of the front window plate and the roof panel of the automobile; rather, provision of such a channel along the upper edge of the front window plate is undesirable since the channel prevents realization of the so-called flush outer surface of the automobile. Hence, as particularly shown in FIG. 12 illustrating the cross-section of the upper portion of the molding member 50, the lip section 61 of the main body 56 in its upper portion is not provided with the projection 62 with a sufficient length to define the channel 63. Furthermore, the lip section 61 assumes an angular position with reference to the leg section 58, which is different from that shown in FIG. 11, and is in direct contact with the surface of the window plate 51 as shown in FIG. 12. This means that the window molding member 50 shown in FIGS. 11 and 12 has a cross-section which varies in the longitudinal direction.

The window molding member 50 shown in FIGS. 11 and 12 can be produced by the method according to the present invention, with a production line which is substantially the same as that shown in FIG. 4. The main difference resides in the arrangement of the first cutting station 27 arranged adjacent to the extrusion die 24. According to the present embodiment, as shown in FIGS. 13 to 15, the first cutting station 27 includes a stationary cutter member 65 which assumes a fixed position with reference to the extrusion die 24, a forming roller 66 supported by a movable frame 67 and adapted to be brought into contact with the lip section 61 of the extruded body 25 forming the molding member 50, thereby to deform the lip section 61 while it is still hot and soft. A screw threaded rod 68 connects the frame 67 with a reversible servomotor 69 which, in turn, is connected to a controller, like the controller 26 as shown in FIG. 4. Thus, the servomotor 69 is adapted to displace the forming roller 66 in the direction M' or N' as shown by double arrow in FIGS. 13 and 14, in accordance with the length of the core element 57 supplied to the extrusion die 24.

Assuming that, as shown in FIG. 16, the window molding member 50 has a pair of side portions 50a, 50b of the length $L_1$, a pair of corner portions 50c, 50d of the length $L_2$ and an upper portion 50e of the length $L_3$, the relation between the displacement of the forming roller 66 in the directions M' and N' and the supplied length of the core element 57 is as shown in FIG. 17.

More particularly, during the period in which the die 24 discharges that portion of the extruded body 25 which corresponds to the side portions 50a, 50b of the molding member 50 with the length $L_1$, the forming roller 66 assumes its uppermost position and is out of contact with the surface of the lip section 61, while the cutter member 65 extends slightly into the projection 62 of the lip section 61 so that a controlled small amount of material is removed from the projection 62, as shown in FIG. 15.

As the detector of the measuring station detects the completion of the supply of the length $L_1$ of the core element 57, or the beginning point of the corner portion 50c of the length $L_2$, the servomotor 69 is actuated in the normal direction, displacing the forming roller 66 in the direction N'. During this movement, the forming roller 66 comes into contact with the lip section 61 to deflect this section counterclockwisely with reference to the leg section 58, from an initial angular position shown in FIG. 15 to a deflected angular position shown in FIG. 13. Such a deflection of the lip section 61 causes the projection 62 to be lowered, as seen in FIGS. 13 to 15, whereas the cutter member 65 assumes a fixed position with reference to the extrusion die 24, so that the projection 62 is subjected to the removal of the material with a gradually increasing depth.

When the detector at the measuring station detects the completion of the supply of the length $L_2$ of the core element 57, or the beginning of the upper portion 50e of the molding member 50 with the length $L_3$, the servomotor 69 is stopped so that the forming roller 66 is maintained in its lowermost position. The resultant maximum deflection of the lip section 61 corresponds to the removal of the material from the projection 62 with the maximum depth.

The forming roller 66 is maintained in this position until the detector of the measuring station detects completion of the supply of the length $L_3$ of the core element 57. The servomotor 69 is then actuated in the reverse direction to displace the forming roller 66 toward the uppermost position. The lip section 61 begins to restore into the initial angular position shown in FIG. 15, and the projection 62 thus moves upwardly with reference to the cutter member 65, so that the cutter member 65 removes material from the projection 62 with a gradually decreasing depth.

The servomotor 69 is stopped as the detector of the measuring station detects completion of the length $L_2$ of the core element 57, and the forming roller 66 is maintained in its uppermost position shown in FIG. 15, for a new cycle of operation, until twice the length $L_1$ of the core element 57 is supplied to the extrusion die 24.

The extruded body 25 is then cooled and solidified, and is further supplied to the second cutting station, like the station 30 shown in FIG. 4, where it is cut into the predetermined length of the window molding member 50 at a point X shown in FIG. 17, which is at the center of the two side portions.

A modification to the above-mentioned embodiment is shown in FIG. 18, in which the cutter member 70 is arranged on or adjacent to the extrusion die 24 and is movable in the directions P' and Q', synchronously with the movement of the forming roller 66 in the directions M' and N'. The depth with which material is removed from the projection 62 is varied by the movement of the cutter member 70, while the forming roller 66 serves to deform the lip section 61 while it is still hot and soft.

The window molding member 50 shown in FIGS. 11 and 12 can be produced in a continuous manner as described above. To arrange the molding member in place, first of all, a strip-like retainer member 71 with a plurality of retaining fins is adhered to the side and upper webs 52a of the automobile body panel 52. The rubber dam 53 is preliminary secured onto the periphery of the rear surface of the window plate 51 which is then applied with adhesive material 53. The window plate 51 is then temporarily supported on the flange 52b of the body panel 52, and the leg section 58 of the molding member 50 is inserted, before the adhesive material 53 hardens, into the gap 59 between the body panel 52 and the window plate 51, engaging fins 58a and 58b of the leg section 58 with the retaining fins of the retainer member 71 and the rear edge of the window plate 51, respectively.

Still another embodiment of the present invention, also applied to the production of the window molding member, will now be explained with reference to FIGS. 19 and 20. This embodiment differs from that shown in FIGS. 11 and 12 essentially in the cross-sectional shape of the molding member, so that same reference numerals are used to denote the same or functionally equivalent elements.

The molding member 50 to be produced includes a main body 56 formed of an appropriate synthetic resin material, a plurality of core elements 57 embedded in the main body 56, an ornamental film 72 with a metallic luster or an appropriate color, which is partly exposed outside, a leg section 58 with fins 58a, 58b, which is to be inserted into the gap 59 formed between the automobile body panel 52 and the window plate 51, a pair of lip sections 60, 61 formed on and projecting from both sides of the leg section 58. Along the side portions of the molding member 50, as shown in FIG. 19, the lip section 61 is provided with a projection 62 in the form of a ridge projecting from that side of the lip section 61 which is remote from the window plate 51. In the upper and corner portions of the molding member 50, as shown in FIG. 20, the synthetic resin material forming the projection 62 is removed, like the projection 62 shown in FIG. 11.

The window molding member 50 shown in FIGS. 19 and 20 can be produced essentially in the manner described with reference to FIG. 4. In this connection, there is shown in FIGS. 21 and 22 a preferred from of the first cutting station 27 for effecting the controlled removal of the material from the lip section 61. More particularly, the station 27 is arranged on or adjacent to the extrusion die 24, and includes a cutter member 73 in the form of a tensioned heated wire which is supported by a movable frame 74 and which, by supplying an electric current, can be heated to a temperature above the softening point, preferably above the melting point of the synthetic resin material. The frame 74 is slidably guided by elongate guide members 75, and connected with a reversible servomotor 76 by means of a screw threaded rod 77. The servomotor 76 is controlled in accordance with the length of a core element 57 supplied to the die, to displace the cutter member 73 in the directions M' and N' and to thus selectively remove the material of the projection 62 on the lip section 61.

When the cutter member 73 supplied with electric current is ultimately urged against the outer surface of the lip section 61, the material of the projection 62 is removed, as shown by the dotted line in FIG. 19, providing a smooth cut surface 62a without undesirable sharp edges. During the period in which the cutter member 73 formed of heated wire removes the material of the projection 62, the cutter member 73 may be moved in its longitudinal direction, in order to avoid scorching of the material by the heat of the wire 73 and the resultant deterioration in the appearance. To this end, also, the surface of the cutting member 73 may be coated with a material having a sufficient heat durability and an excellent low frictional coefficient, such as polytetrafluoroethylene (PTFE). Use of the heated wire 73 heated above the softening point of the synthetic resin material is desirable, since the resistance to which the cutter member 73 is subjected during the removal of the material can be substantially reduced. In particular, the heated wire 73 heated above the melting point of the synthetic resin material advantageously provides the cut surface 62a with an excellent glazing. Furthermore, as shown in FIG. 21, the extruded body 25 is discharged from the die with such an orientation that the projection 62 on the lip section 61 is directed downwardly. By this, the material removed from the lip section 61 undergoes a descending motion by the gravity, and may be received in an appropriate container arranged below the cutting station, without requiring the provision of a take-up device.

The window molding member 50 shown in FIGS. 19 and 20 is for a windshield plate on the front side of an automobile, so that the projection 62 has been removed along the upper and corner portions to prevent undesirable side flow of the water across the front pillar. When, however, the molding member is to be arranged along the periphery of the rear window, the projection 62' may be formed on the lip section 60, as shown by the imaginary line in FIG. 20. The projection 62' may be removed along the corner and side portions to realize a flush surface of the automobile, and may be present along the upper portion to prevent flow of water from the roof onto the surface of the rear window and to thereby preserve a necessary rear sight in the rainy climate condition.

It is of course that various modifications may be made to the arrangement of the cutting member. For example, the cutting member may be formed of a blade 78 with a curvature which coincides with that of the lip section 61, as shown in FIG. 23. The cutting member 78 may be formed with a coated layer of polytetrafluoroethylene (PTFE) or other suitable material with a low frictional coefficient, to reduce the resistance during the removal of the synthetic resin material from the lip section 61, and to provide a smooth cut surface of the molding member. Instead of a linear motion of the cutting member toward and away from the lip section 61, as in the previous embodiments, the cutting member may be mounted on a swing arm guided along an arcuate path. Furthermore, when it is desirable to arrange the servomotor or the like drive means for the cutting member as far from the heat source as possible, the drive means may be connected to the screw threaded rod indirectly, i.e. with a flexible shaft, or with a spline shaft combined with universal joints.

A further embodiment of the window molding member 50 is shown in FIG. 24, which is similar to that explained with reference to FIGS. 19 and 20, but in which the leg section 58 is provided with a side projection 58c on its free end such that the window plate 51 is brought into engagement with the molding member 50 between the lip section 61 and the side projection 58c. In this case also, the synthetic resin material is selectively removed from the lip section 61 in accordance with the length of the core element supplied to the die.

From the foregoing description, it will be appreciated that the present invention provides a novel method of producing elongate molding members for automobiles, whereby the longitudinally variable cross-sectional shape of the molding member can be readily obtained essentially based on extrusion molding technology, simply by removing a controlled amount of the synthetic resin material from a predetermined location of the continuous body after it has been extruded, and by subsequently cutting the continuous body into a predetermined length of the molding member. The present invention is advantageous in that all the process steps can be carried out continuously, as contrasted with the conventional injection molding method, so that it is possible to produce the molding member with the desired, longitudinally variable cross-sectional shape, by means of a compact arrangement of the facility, and with a markedly improved productivity.

What is claimed is:

1. A molding member for an automobile, said molding member being formed at least partly of a synthetic resin material, said molding member being a front window molding member which includes a leg section including at least one fin adapted to engage with a body panel of the automobile and a main body adapted to cover a gap formed between a window plate and an automobile body panel, a lip section projecting in its cross-section from said main body and adapted to cover the outer periphery of said window plate, and a ridge section projecting in its cross-section from said lip section for preventing flow of water across a side edge of said window plate, said molding member being produced by a method which comprises the steps of:
   (a) extruding the synthetic resin material into an elongate continuous body with a substantially constant cross-section throughout the entire length thereof;
   (b) detecting an extruded length of the continuous body;
   (c) removing from said continuous body a controlled amount of the synthetic resin material, synchronously with the extrusion of the synthetic resin material and immediately after the continuous body has been extruded while it is still soft and hot, such that the cross-section of said continuous body varies in a longitudinal direction thereof, said controlled amount being controlled in accordance with a detected length of the continuous body detected in step (b); and
   (d) subsequently cutting said continuous body into a predetermined length of the molding member, wherein said molding member has an upper portion adapted to extend along the junction between an upper edge of said window plate and a roof panel of the automobile, wherein said lip section of said molding member, as extruded, has a projection near a free end thereof, said projection forming said ridge section which is adapted to bear against an outer surface of said window plate, wherein said controlled amount of the synthetic resin material is removed from said ridge section along said upper portion and wherein said lip section along said upper portion is oriented relative to said leg section such that said free end is adapted to bear against said surface of said window plate.

2. A molding member for an automobile, said molding member being formed at least partly of a synthetic resin material, said molding member being a rear window molding member which includes a leg section including at least one fin adapted to engage with a body panel of the automobile and a main body adapted to cover a gap formed between a window plate and an automobile body panel, a lip section projecting in its cross-section from said main body and adapted to cover the outer periphery of said window plate, and a ridge section projecting in its cross-section from said lip section for preventing flow of water onto said window plate, said molding member being produced by a method which comprises the steps of:

(a) extruding the synthetic resin material into an elongate continuous body with a substantially constant cross-section throughout the entire length thereof;

(b) detecting an extruded length of the continuous body;

(c) removing from said continuous body a controlled amount of the synthetic resin material, synchronously with the extrusion of the synthetic resin material and immediately after the continuous body has been extruded while it is still soft and hot, such that the cross-section of said continuous body varies in a longitudinal direction thereof, said controlled amount being controlled in accordance with a detected length of the continuous body detected in step (b); and (d) subsequently cutting said continuous body into a predetermined length of the molding member, wherein said molding member has a side portion adapted to extend along the junction between a side edge of said window plate and a rear pillar of the automobile, wherein said lip section of said molding member, as extruded, has a projection forming said ridge section, wherein said controlled amount of the synthetic resin material is removed from said projection along said side portion, and wherein said lip section along said side portion is oriented with respect to said leg section such that a free end of said lip section is adapted to bear against said surface of said window plate.

3. A molding member for an automobile, said molding member being formed at least partly of a synthetic resin material, said molding member being a front window molding member which includes a leg section including at least one fin adapted to engage with a body panel of the automobile and a main body adapted to cover a gap formed between a window plate and an automobile body panel, a lip section projecting in its cross-section from said main body and adapted to cover the outer periphery of said window plate, and a ridge section projecting in its cross-section from said lip section for preventing flow of water across a side edge of said window plate, said molding member being produced by a method which comprises the steps of:

(a) extruding the synthetic resin material into an elongate continuous body with a substantially constant cross-section throughout the entire length thereof;

(b) detecting an extruded length of the continuous body;

(c) removing from said continuous body a controlled amount of the synthetic resin material, synchronously with the extrusion of the synthetic resin material, such that the cross-section of said continuous body varies in a longitudinal direction thereof, said controlled amount being controlled in accordance with a detected length of the continuous body detected in step (b); and (d) subsequently cutting said continuous body into a predetermined length of the molding member, wherein said molding member has an upper portion adapted to extend along the junction between an upper edge of said window plate and a roof panel of the automobile, wherein said lip section of said molding member, as extruded, has a projection near a free end thereof, said projection forming said ridge section which is adapted to bear against an outer surface of said window plate, wherein said controlled amount of the synthetic resin material is removed from said ridge section along said upper portion and wherein said lip section along said upper portion is oriented relative to said leg section such that said free end is adapted to bear against said surface of said window plate.

4. A molding member for an automobile, said molding member being formed at least partly of a synthetic resin material, said molding being a front window molding member which includes a leg section including at least one fin adapted to engage with a body panel of the automobile and a main body adapted to cover a gap formed between a window plate and an automobile body panel, a lip section projecting in its cross-section from said main body and adapted to cover the outer periphery of said window plate, and a ridge section projecting in its cross-section from said lip section for preventing flow of water across a side edge of said window plate, said molding member being produced by a method which comprises the steps of:

(a) continuously supplying a core element to an extrusion die and co-extruding said synthetic resin material about said core element into an elongate continuous body with a substantially constant cross-section throughout the entire length thereof;

(b) detecting a supplied length of said core element;

(c) removing from said continuous body a controlled amount of the synthetic resin material, synchronously with the extrusion of the synthetic resin material, such that the cross-section of said continuous body varies in a longitudinal direction thereof, said controlled amount being controlled in accordance with a supplied length of said core element detected in step (b); and (d) subsequently cutting said continuous body into a predetermined length of the molding member, wherein said molding member has an upper portion adapted to extend along the junction between an upper edge of said window plate and a roof panel of the automobile, wherein said lip section of said molding member, as extruded, has a projection near a free end thereof, said projection forming said ridge section which is adapted to bear against an outer surface of said window plate, wherein said controlled amount of the synthetic resin material is removed from said ridge section along said upper portion and wherein said lip section along said upper portion is oriented relative to said leg section such that said free end is adapted to bear against said surface of said window plate.

5. A molding member for an automobile, said molding member being formed at least partly of a synthetic resin material, said molding member being a rear window molding member which includes a leg section including at least one fin adapted to engage with a body panel of the automobile and a main body adapted to cover a gap formed between a window plate and an automobile body panel, a lip section projecting in its cross-section from said main body and adapted to cover the outer periphery of said window plate, and a ridge section projecting in its cross-section from said lip section for preventing flow of water onto said window plate, said molding member being produced by a method which comprises the steps of:
 (a) extruding the synthetic resin material into an elongate continuous body with a substantially constant cross-section throughout the entire length thereof;
 (b) detecting an extruded length of the continuous body;
 (c) removing from said continuous body a controlled amount of the synthetic resin material, synchronously with the extrusion of the synthetic resin material, such that the cross-section of said continuous body varies in a longitudinal direction thereof, said controlled amount being controlled in accordance with a detected length of the continuous body detected in step (b); and
 (d) subsequently cutting said continuous body into a predetermined length of the molding member, wherein said molding member has a side portion adapted to extend along the junction between a side edge of said window plate and a rear pillar of the automobile, wherein said lip section of said molding member, as extruded, has a projection forming said ridge section, wherein said controlled amount of the synthetic resin material is removed from said projection along said side portion and wherein said lip section along said side portion is oriented with respect to said leg section such that a free end of said lip section is adapted to bear against said surface of said window plate.

6. A molding member for an automobile, said molding member being formed at least partly of a synthetic resin material, said molding being a rear window molding member which includes a leg section including at least one fin adapted to engage with a body panel of the automobile and a main body adapted to cover a gap formed between a window plate and an automobile body panel, a lip section projecting in its cross-section from said main body and adapted to cover the outer periphery of said window plate, and a ridge section projecting in its cross-section from said lip section for preventing flow of water onto said window plate, said molding member being produced by a method which comprises the steps of:
 (a) continuously supplying a core element to an extrusion die and co-extruding said synthetic resin material about said core element into an elongate continuous body with a substantially constant cross-section throughout the entire length thereof;
 (b) detecting a supplied length of said core element;
 (c) removing from said ridge section of said continuous body a controlled amount of the synthetic resin material, synchronously with the extrusion of the synthetic resin material, such that the cross-section of said continuous body varies in a longitudinal direction thereof, said controlled amount being controlled in accordance with a supplied length of said core element detected in step (b); and
 (d) subsequently cutting said continuous body into a predetermined length of the molding member, wherein said molding member has a side portion adapted to extend along the junction between a side edge of said window plate and a rear pillar of the automobile, wherein said lip section of said molding member, as extruded, has a projection forming said ridge section, wherein said controlled amount of the synthetic resin material is removed from said projection along said side portion and wherein said lip section along said side portion is oriented with respect to said leg section such that a free end of said lip section is adapted to bear against said surface of said window plate.

* * * * *